June 24, 1924.
G. D. SUNDSTRAND
VERTICAL MILLING ATTACHMENT
Filed Dec. 27, 1920
1,499,084
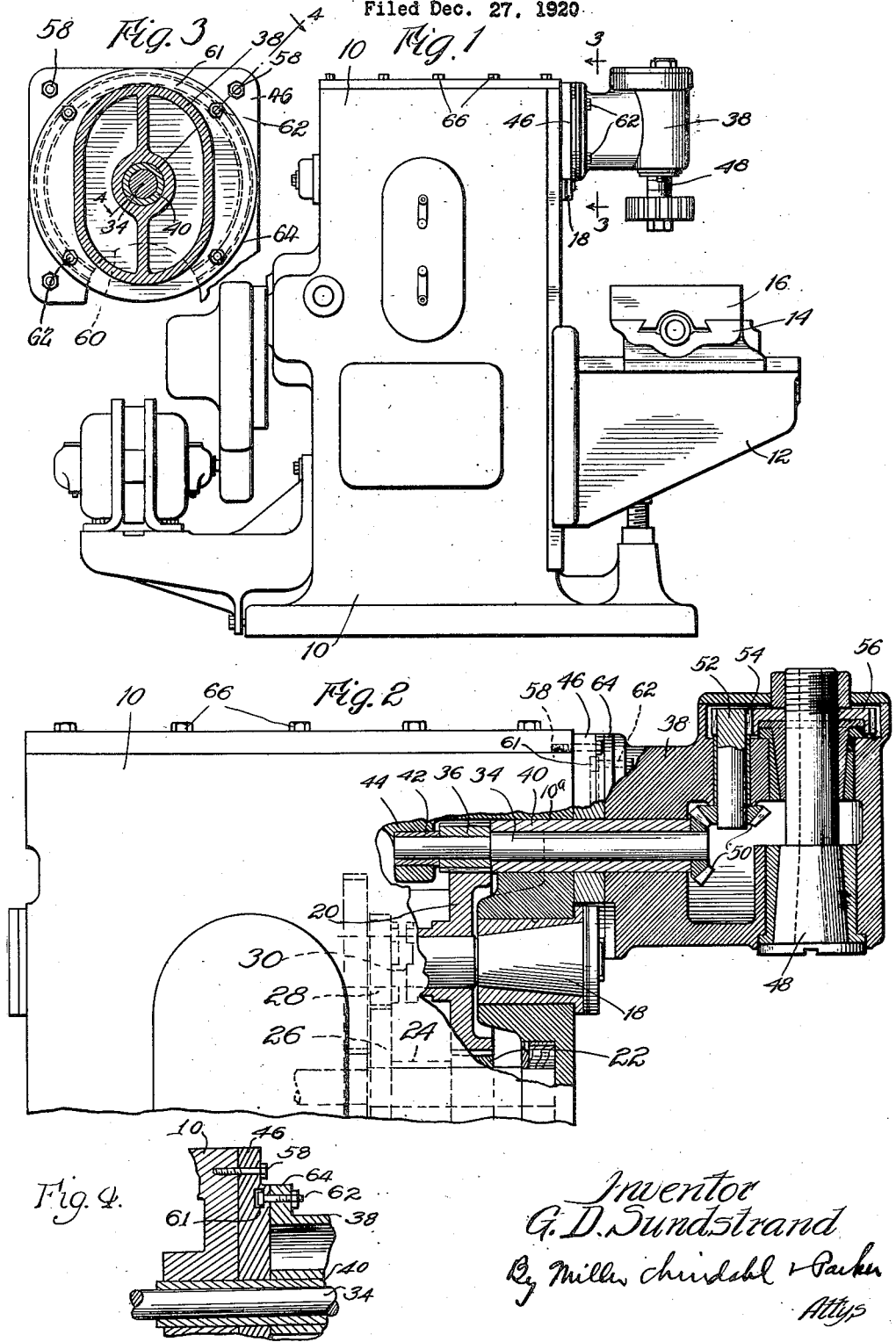

Patented June 24, 1924.

1,499,084

UNITED STATES PATENT OFFICE.

GUSTAF DAVID SUNDSTRAND, OF ROCKFORD, ILLINOIS, ASSIGNOR TO ROCKFORD MILLING MACHINE COMPANY, OF ROCKFORD, ILLINOIS, A CORPORATION OF ILLINOIS.

VERTICAL MILLING ATTACHMENT.

Application filed December 27, 1920. Serial No. 433,101.

*To all whom it may concern:*

Be it known that I, GUSTAF DAVID SUNDSTRAND, a citizen of the United States, residing at Rockford, in the county of Winnebago and State of Illinois, have invented certain new and useful Improvements in Vertical Milling Attachments, of which the following is a specification.

My invention relates to milling machines and more specifically to an improved vertical milling attachment.

One object of the invention is to provide a vertical milling attachment whch may be readily mounted in place on a milling machine of ordinary design.

Another object is to provide such an attachment in which the spindle may be swung into any position about a horizontal axis parallel to the axis of the main spindle.

Another object is to provide a simple and efficient connection for the attachment whereby it may be driven through the change speed gears ordinarily used for driving the spindle.

Another object is to provide an arrangement such that this connection may be established from in front of the machine merely by placing the attachment in operative position.

Further objects and advantages of my invention will become apparent as the description proceeds.

In the accompanying drawings Figure 1 is a side view of a common type of milling machine illustrating the application of my invention thereto. Fig. 2 is a fragmentary view partly in section of the machine shown in Fig. 1. Fig. 3 is a section on the line 3—3 of Fig. 1. Fig. 4 is a section on line 4—4 of Fig. 3.

In the embodiment of my invention selected for illustration, the improved vertical milling attachment is mounted on a milling machine of the well known knee type comprising a column 10, a vertically slidable knee 12, a saddle 14 slidable on the knee toward and away from the column, and a table 16 slidable on the saddle. The main spindle 18 is of the usual or any preferred type of construction and may be driven at a large variety of different speeds through a series of change speed gears including a final gear 20 splined on the spindle, a pinion 22 meshing with the final gear and mounted on the same sleeve 24 with gear 26 driven by a pinion 28 rotatable about the spindle itself. The speed of the drive may be changed by sliding sleeve 24 to the right and gear 20 to the left, to move parts 26 and 28, and parts 22 and 20, all out of mesh; and to engage clutch teeth 30 to clutch pinion 28 to the spindle. Pinion 28 itself may be driven at any one of a considerable number of different speeds. As the mechanism for driving the pinion 28 may be of any desired type and per se forms no part of the present invention, detailed description of the same is deemed unnecessary.

The final gear 20 is of considerably larger diameter than the projecting end of the spindle 18 and a hole 10$^a$ is formed in the face of the column 10 through which a shaft 34 carrying a pinion 36 may enter to bring the pinion into mesh with the gear 20. The shaft 34 is permanently associated with the body 38 of the improved attachment as by means of a sleeve 40 forming a bearing for the shaft and permanently fastened in place in the body 38. The shaft 34 projects beyond the end of pinion 36 and is received when the attachment is placed in position in a bushing 42 carried by a lug 44 projecting from the wall of the column 10. A suitable transmission from shaft 34 to the attachment spindle 48 has been shown comprising bevel gears 50 driving a short vertical shaft 52 which carries pinion 54 meshing with gear 56 carried by the spindle 48.

The vertical milling attachment comprises a base or block 46 (Fig. 3) adapted to be secured to the forward side of the column by any suitable means, such as clamping bolts 58, said block being cut away as indicated at 60 in Fig. 3 to clear the projecting end of the main spindle. A circular undercut or T-slot 61 in the exposed face of the block receives the heads of bolts 62 passing through the flange 64 on the body 38, by means of which bolts the body may be bolted to the block 46 with the attachment spindle 48 in vertical position, or in any desired inclined position into which it may be swung by rotating the body around the axis of shaft 34. The sleeve 40 is rotatable within the base 46 of the vertical milling attachment and the aperture 10$^a$ in the column.

The usual clamping bolts 66 are shown in Fig. 1, which bolts may be used to fasten an overarm of any desired design in place on the top of the column. It will be seen that upon removal of the overarm my improved attachment may be readily put in place from the front of the machine, the power connection for driving the same being established by the act of positioning it in place and the connection being such that the same number of different speeds may be obtained for the attachment spindle as for the main spindle. It will be noted that the pinion 36 is long enough to remain in mesh with the gear 20 in all positions of the latter.

While I have illustrated and described in detail the preferred embodiment of my invention, it should be clearly understood that the disclosure is merely for purposes of illustration and that many modifications and variations will naturally occur to those skilled in the art. It will, for instance, be obvious that additional adjustments for the attachment spindle may be provided without the exercise of invention and without in any way interfering with the mounting of the attachment on the column. Without further elaboration, the foregoing will so fully explain the gist of this invention that others can, by applying current knowledge, readily adapt it for various applications without omitting certain features that, from the standpoint of the prior art, apparently constitute the essential characters of the generic aspects of this invention, and therefore such adaptations should and are intended to be comprehended within the meaning and range of equivalency of the following claims.

I claim as my invention:

1. The combination with a milling machine having a column, a main spindle and a drive gear mounted in the column, the wall of said column having a horizontal aperture above said spindle, of a milling attachment comprising a base adapted to be secured to the forward side of the column, a shaft secured in the base and adapted to enter said aperture, and a pinion carried by the shaft adapted to mesh with said drive gear to drive said shaft therefrom, the shaft and the pinion being withdrawable from the aperture with the removal of the vase from the column.

2. In a milling machine, in combination, a column, a main spindle in said column, said column having an aperture above said main spindle, an attachment having a projecting shaft adapted to be inserted into said aperture, a pinion fixed on said shaft and small enough in diameter to pass through said aperture when the shaft is inserted therein, said gear being adapted to mesh with a gear carried by said main spindle, an attachment spindle carried by said attachment, an operative connection between said projecting shaft and said attachment spindle, and means for clamping said attachment against the face of the column.

3. In a milling machine, in combination, a column, overarm clamping means at the top of the column, a main spindle below the clamping means, the front face of the column having an aperture between the clamping means and the spindle and a vertical milling attachment having a projecting shaft positioned to enter the aperture when the attachment is mounted in position on the column, and a gear on the shaft moved into mesh with one of the gears which drive the main spindle by the insertion of the shaft in the aperture.

4. In a milling machine, in combination, a column, a main spindle in said column, the face of the column having an aperture, a shaft, and a pinion carried thereby adapted to be inserted in said aperture to bring said pinion into mesh with one of the gears which drive the main spindle.

5. In a milling machine, in combination, a column, a main spindle in said column, the face of the column having an aperture, a shaft and a pinion carried thereby adapted to be inserted in said aperture to bring said pinion into mesh with one of the gears which drive the main spindle, the end of said shaft projecting beyond the pinion, and a fixed bearing member carried by the column positioned to receive the end of the shaft.

6. A milling machine having, in combination, a column, a main spindle in the column, change gears in the column for driving the spindle, said change gears including a final drive gear having a diameter greater than the projecting end of said spindle, the column having a horizontal aperture above said spindle; and a milling attachment comprising, in combination, a base, means to secure the base to the forward side of the column above the spindle, a body connected to the base, a shaft rotatably supported in the body and extending through the base and through said aperture, a pinion fixed to said shaft in position to mesh with said drive gear, said pinion being of less diameter than said aperture, a spindle carried by the body, and a gear train connecting said shaft to the last mentioned spindle.

7. A vertical milling attachment comprising, in combination, a base having a circular undercut T-slot, a body having a flange overlying said slot, bolts carried by said flange having heads extending into said slot, a sleeve fixed to said body about which said bolts are circumferentially disposed, said sleeve extending rotatably through the base and projecting beyond the rear side of the base, a shaft journaled in said sleeve and projecting beyond the rear end of the sleeve, a pinion fixed to said shaft rearwardly of the sleeve, the rearwardly projecting portion of said sleeve being at least as large in diameter as said pinion, said shaft projecting rearwardly beyond the pinion, a spindle carried by the body, and a gear train connecting said shaft to the spindle.

8. A vertical milling attachment comprising, in combination, a base having a circular undercut T-slot, a body having a flange overlying said slot, bolts carried by said flange having heads extending into said slot, a sleeve fixed to said body about which said bolts are circumferentially disposed, said sleeve extending rotatably through the base, a shaft journaled in said sleeve and projecting beyond the rear side of the base, a pinion fixed to said shaft rearwardly of the base, said shaft projecting rearwardly beyond the pinion, a spindle carried by the body, and a gear train connecting said shaft to the spindle.

9. A vertical milling attachment comprising, in combination, a base, a body, a sleeve fixed to one of said parts and extending rotatably through the other, a shaft journaled in said sleeve and projecting beyond the rear side of the base, a pinion fixed to said shaft rearwardly of the base, a spindle carried by the body, a gear train connecting said shaft to the spindle, said body being adjustable with reference to the base on the axis of the shaft, and means for securing the body to the base in adjusted position.

In testimony whereof, I have hereunto set my hand.

GUSTAF DAVID SUNDSTRAND.